(12) United States Patent
Provance

(10) Patent No.: US 6,731,613 B1
(45) Date of Patent: May 4, 2004

(54) POWER MANAGEMENT USING A BANDWIDTH CONTROL MECHANISM

(75) Inventor: Curtis Alan Provance, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 801 days.

(21) Appl. No.: 09/594,617

(22) Filed: Jun. 14, 2000

(51) Int. Cl.[7] .............................................. G08C 17/00
(52) U.S. Cl. ...................... 370/311; 370/230; 370/343; 370/401; 370/235; 455/3.02; 455/500
(58) Field of Search ................................. 370/229, 230, 370/232, 234, 235, 236, 277, 310, 311, 315, 316, 318, 323, 325, 342, 343, 344, 347, 355, 401, 429, 465, 468; 455/3.02, 500

(56) References Cited

U.S. PATENT DOCUMENTS

| | | | |
|---|---|---|---|
| 5,408,237 A | * 4/1995 | Patterson et al. | 342/354 |
| 5,574,968 A | 11/1996 | Olds et al. | |
| 5,826,188 A | 10/1998 | Tayloe et al. | |
| 5,991,279 A | * 11/1999 | Haugli et al. | 370/311 |
| 6,081,710 A | * 6/2000 | Sherman et al. | 455/428 |
| 6,084,864 A | * 7/2000 | Liron | 370/316 |
| 6,377,561 B1 | * 4/2002 | Black et al. | 370/330 |
| 6,400,925 B1 | * 6/2002 | Tirabassi et al. | 455/12.1 |
| 6,535,482 B1 | * 3/2003 | Salim et al. | 370/229 |
| 6,594,246 B1 | * 7/2003 | Jorgensen | 370/338 |
| 6,625,118 B1 | * 9/2003 | Salim et al. | 370/229 |

OTHER PUBLICATIONS

"Random Early Detection Gateways for Congestion Avoidance" by Sally Floyd and Van Jacobson, Aug. 1993 IEEE/ACM Transactions on Networking, 32 pages.

* cited by examiner

Primary Examiner—Hassan Kizou
Assistant Examiner—Mike McLoughlin
(74) Attorney, Agent, or Firm—Frank J. Bogacz

(57) ABSTRACT

A buffered packet switching network component provides a communication path between a packet source and a packet destination. The packet switching network component includes a bandwidth control mechanism that reduces communication traffic in response to buffer congestion. The bandwidth control mechanism is also utilized to conserve power. When the buffered packet switching network component detects a transition event, a parameter of the bandwidth control mechanism is modified such that a transferred packet indicates the packet switching network component is congested. In response to the congestion, a packet source is requested to reduce the rate at which it is sending packets through the congested packet switching network component. As network traffic is reduced, unused devices of the packet switching network component are deactivated such that power is conserved.

18 Claims, 4 Drawing Sheets

POWER MANAGEMENT USING A BANDWIDTH CONTROL MECHANISM

BACKGROUND OF THE INVENTION

1. Field of the Invention

The present invention is generally directed to a communication system, and more particularly to managing the power utilized by a buffered packet switching network component of a communication system.

2. Background Information

Various bandwidth control mechanisms have been utilized for congestion avoidance in communications systems that include buffered packet switching network components. For example, a number of random early detection (RED) algorithms have been implemented in terrestrial-based gateways. A typical gateway, implementing a RED algorithm, notifies packet sources and packet destinations of congestion either by dropping packets or by setting a bit in a header of a given packet. In this manner, a RED gateway attempts to keep its average queue size low while storing occasional bursts of packets in its queue.

Various forms of RED algorithms have been implemented within gateways. Examples of known RED algorithms include weighted RED, adaptive RED, distributed RED, distributed weighted RED, etc. Such algorithms implementing the assorted forms of RED are well known to one of ordinary skill in the art. RED algorithms have also been implemented in packet-based network components that include buffers (e.g., FIFO buffers) other than gateways (e.g., routers). As mentioned above, the purpose of RED is to prevent buffer overflow while maintaining a near maximum utilization of the packet network. A given RED algorithm generally performs a time-weighted average buffer size calculation that is compared to a set of marking and/or deleting parameters. If the average buffer size falls below the minimum parameters, no action is taken. If the average buffer size exceeds the maximum parameters, an action, such as marking or deleting, is guaranteed to occur. When the average buffer size falls between the minimum and maximum parameters, the probability that an action (marking or deleting) will occur is a function, e.g., linear proportion, of the average buffer size.

An adaptive RED implementation monitors how long the average buffer size is in each of three distinct domains (i.e., less than a minimum, between the minimum and a maximum, and greater than the maximum) and adjusts the minimum and maximum parameters for marking and deleting, accordingly. Reducing either marking parameter increases the probability that a packet is marked, thus signaling congestion to the packet destination. In response to receiving a marked packet, a packet destination typically sends a request to the packet source to reduce the rate at which packets are sent through the congested link. In this manner, the various forms of RED attempt to enlist the aid of network users to voluntarily reduce traffic, so as to prevent buffer overflow and the subsequent loss of packets. RED algorithms have also been implemented in various space-based packet switching network components (e.g., satellites) in an effort to reduce component congestion.

In addition to congestion in a packet switching network component, another matter of concern with respect to satellites and many other devices that include packet switching network components, is power management. A typical satellite includes storage cells or batteries that supply operating power to the electronic circuits of the satellite. These storage cells or batteries, which are recharged by solar panels, store energy for use during high power demands or during dark periods. Dark periods occur when a given satellite, within a constellation, is shadowed from the Sun by the Earth. At most, a typical satellite, within a constellation, may be shadowed by the Earth for thirty-five percent of its orbit. At best, each individual satellite is typically in full view of the sun for approximately thirty percent of its orbit. Thus, during high power demands or dark periods, satellite power management is typically necessary. Additionally, terrestrial-based packet switching network components can benefit from power management (i.e., conservation) during peak power usage, among other conditions.

BRIEF DESCRIPTION OF THE DRAWINGS

The present invention will hereinafter be described in conjunction with the appended drawings figures, wherein like numerals denote like elements, and.

DETAILED DESCRIPTION OF THE PREFERRED EXEMPLARY EMBODIMENT(S)

The ensuing detailed description provides preferred exemplary embodiments only, and is not intended to limit the scope, applicability or configuration of the invention. Rather, the ensuing detailed description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention is directed to a buffered packet switching network component that provides a communication path between a packet source and a packet destination. More specifically, the present invention is directed to a technique for conserving power in a buffered packet switching network component that responds to a bandwidth control mechanism by reducing communication traffic in response to buffer congestion. When the buffered packet switching network component has a transition event (e.g., low battery, high transmitter temperature, the expiration of a timer that indicates when an eclipse event will occur or an expensive power period), a parameter of the bandwidth control mechanism is modified such that a transferred packet indicates the packet switching network component is congested. In response to the congestion of the network component, a packet source is requested to reduce its packet rate. Unused devices, such as transceivers, of the buffered packet switching network component are then deactivated such that power is conserved. The present invention is applicable to both space-based devices (e.g., satellites) and terrestrial-based devices (e.g., routers and gateways) that include buffered packet switching network components.

As utilized herein, the term "satellite" includes a man-made object or vehicle for orbiting a celestial body such as the Earth and encompasses both geostationary and orbiting satellites. As used herein, the term "constellation" includes a group of satellites arranged in orbits for providing coverage (e.g., radio communication) over a portion or all of a celestial body and may include geostationary satellites, orbiting satellites (i.e., low-Earth orbiting (LEO) satellites and medium Earth orbiting satellites), or combinations of such satellites. A constellation typically includes multiple rings (or planes) of satellites and may have equal numbers of satellites in each plane. The term "cell" and "antenna pattern" are not intended to be limited to any particular mode of generation and includes those created by either terrestrial or satellite cellular communication systems and/or combinations thereof.

Figure 1:
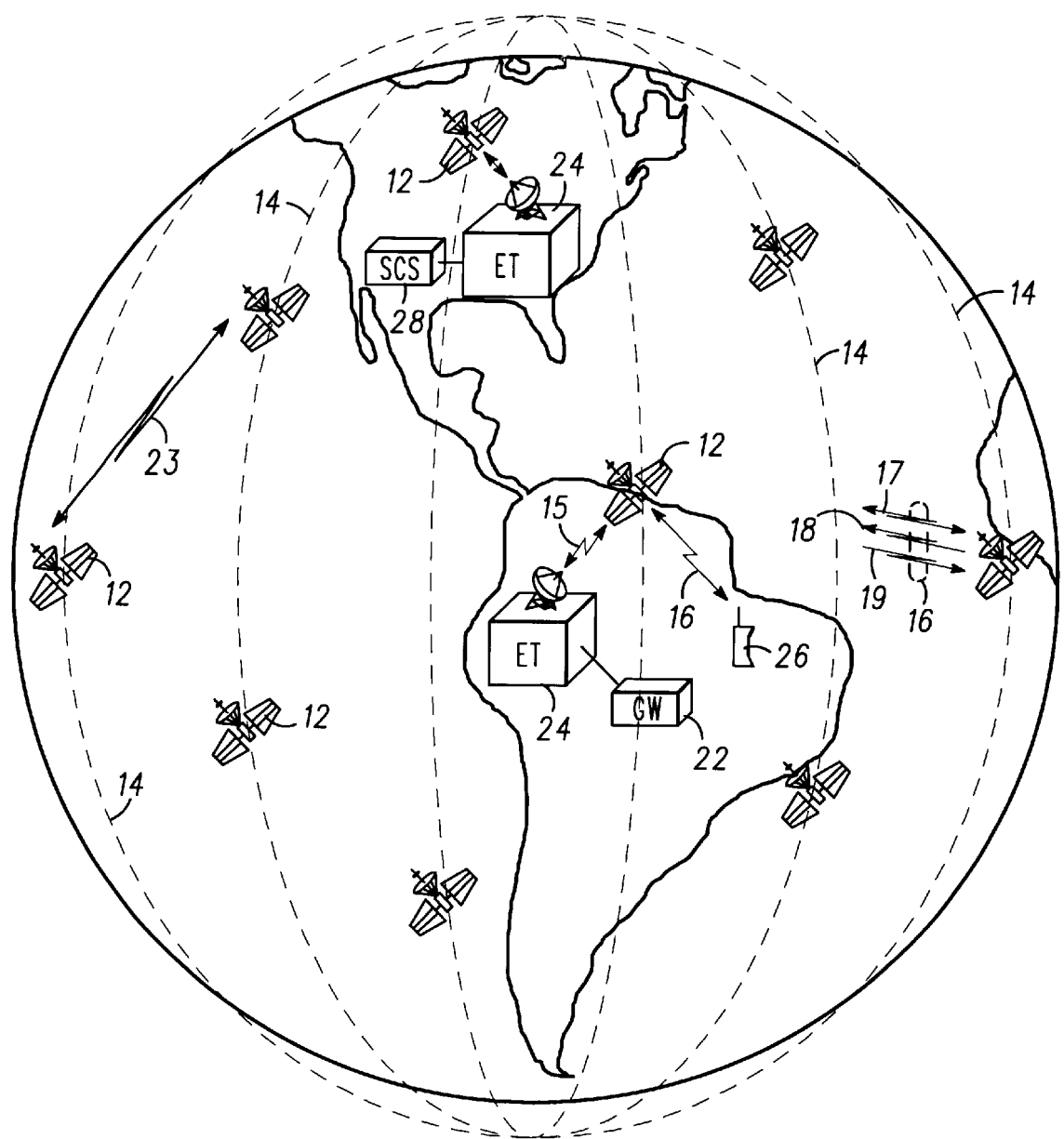
FIG. 1 is a simplified diagram of a communication system utilizing satellites that include a buffered packet switching network component, according to the present invention.

FIG. 1 illustrates a simplified diagram of a communication system 10 that includes a plurality of orbiting satellites 12 occupying a plurality of polar orbits 14. The present invention is also applicable to satellite communication systems that have non-polar orbits (e.g., equatorial). While only nine satellites 12 and six polar orbits 14 are shown in FIG. 1, one of ordinary skill in the art will appreciate that any number of satellites or orbits may be utilized to provide a desired coverage.

When satellites 12 are LEO satellites, a line-of-sight electromagnetic (e.g., radio and light) communication of any one satellite 12 covers a relatively small area of the Earth, at any instant. A typical LEO satellite 12 travels at approximately twenty-five thousand kms/hr with respect to the Earth. As such, each satellite 12 is visible to a terrestrial station, such as individual subscriber unit (ISU) 26, for a period of approximately nine minutes, according to the system shown.

Each satellite 12 communicates with terrestrial stations, which may include some number of ISUs 26 and Earth terminals (ETs) 24 connected to a system control segment (SCS) 28 or a gateway (GW) 22. Each GW 22 may provide access to a public switched telephone network (PSTN) (not shown in FIG. 1) or other communication facility. ETs 24 may be adjacent to or separate from SCSs 28 and/or GWs 22. ETs 24 that are associated with SCSs 28 receive data describing tracking of satellites 12 and relay packets of control information. ETs 24 associated with GW 22 typically only relay data packets (e.g., relating to calls in progress).

ISUs 26 may be located anywhere on the surface of the Earth or in the atmosphere above the Earth, such as aboard an airplane. ISUs 26 are preferably communication devices capable of transmitting data to and receiving data from satellites 12. By way of example, ISU 26 may be a hand-held portable cellular telephone adapted to communicate with satellites 12. Normally, ISU 26 does not perform any control functions for communication system 10.

Communication system 10 may accommodate a large number of ISUs 26, which typically communicate with nearby satellites 12 via subscriber links 16. Links 16 encompass a limited portion of the electromagnetic spectrum that is divided into numerous channels. For example, links 16 may be combinations of L-Band frequency channels and may encompass various air interface standards (e.g., Frequency Division Multiple Access (FDMA), Time Division Multiple Access (TDMA), Code Division Multiple Access (CDMA)), or a combination of such air interface standards. At a minimum, satellite 12 regularly transmits over one or more broadcast channels 18. ISUs 26 synchronize to broadcast channels 18 and monitor broadcast channels 18 to detect messages which are addressed to them. ISUs 26 transmit messages to satellites 12 over one or more acquisition channels 19. Broadcast channels 18 and acquisition channels 19 are typically not dedicated to any one ISU 26, but are shared by all ISUs 26 currently within the footprint of a given satellite 12.

Traffic channels 17 are typically two-way real-time channels that are assigned to a particular ISU 26, by a given satellite 12, from time-to-time. Preferably, a digital format is used to communicate data over channels 17–19. At least one traffic channel 17 is assigned for each call, and each traffic channel 17 has sufficient bandwidth to support, at a minimum, a two-way voice conversation. To support real-time communications, a TDMA scheme may be used to divide time into frames (e.g., ten to ninety milliseconds). In such a scheme, each ISU 26 is assigned a specific traffic channel 17 and specific transmit and receive time-slots within each frame of the specific traffic channel 17. Analog audio signals are preferably digitized such that during each frame the digitized audio signal is transmitted or received in a single short high-speed burst during an allotted time-slot. Each satellite 12 may support up to a thousand or more traffic channels 17 such that each satellite 12 can simultaneously service a number of independent calls. Those of ordinary skill in the art will appreciate that traffic channels 17 can be formed without a time-slot structure and that methods that do not require digitizing an analog signal (e.g., voice) may be employed. Various known techniques may be employed to form the channels and process the voice communication.

Satellites 12 communicate with other nearby satellites 12 through cross-links 23. Thus, a call or communication from an ISU 26 located at any point on or near the surface of the Earth may be routed through the constellation of satellites 12 to within range of substantially any other point on the surface of the Earth. A communication may be routed down to an ISU 26 on or near the surface of the Earth from a satellite 12 using subscriber link 16. Alternatively, a communication may be routed down to or up from ETs 24, of which FIG. 1 shows only two, through Earth links 15. ETs 24 are usually distributed over the surface of the Earth in accordance with geographical/political boundaries. Each satellite 12 is preferably capable of communicating with multiple ETs 24 and ISUs 26 at any given instant.

SCS 28 monitors the health and status of system communication nodes (e.g., GWs 22, ETs 24 and satellites 12) and normally manages operations of communication system 10. One or more ETs 24 provide the primary communications interface between SCS 28 and satellites 12. ETs 24 typically include antennas and RF transceivers for performing telemetry, tracking and control functions for the constellation of satellites 12.

GWs 22 may perform call processing functions in conjunction with satellites 12 or GWs 22 may exclusively handle call processing and allocation of call handling capacity within communication system 10. Various terrestrial-based communication systems, such as the PSTN (not shown in FIG. 1), may access communication system 10 through GWs 22.

When the Earth is fully covered by satellites 12, any satellite 12 may be in direct or indirect data communication with any ISU 26 or ET 24 at any time by routing data through the constellation of satellites 12. Accordingly, communication system 10 may establish a communication path for relaying data through the constellation of satellites 12 between any two ISUs 26, between SCS 28 and GW 22, between any two GWs 22 or between ISU 26 and GW 22. The present invention is also applicable to satellite constellations where full coverage of the Earth is not achieved (i.e., where there are "holes" in the communications coverage provided by the constellation) and constellations where plural coverage of portions of the Earth occur (i.e., more than one satellite is in view of a point on the Earth's surface).

In general terms, communication system 10 may be viewed as a network of nodes. Each satellite 12, GW 22, SCS 28 and ISU 26 represents a node of communication system 10. All nodes of communication system 10 are or may be in data communication with any other node of communication system 10, through communication links 15, 16 and/or 23. In addition, all nodes of communication system 10 are or may be in data communication with other telephonic devices dispersed throughout the world through PSTNs and/or conventional terrestrial cellular telephone devices coupled to a PSTN through conventional terrestrial base stations.

As discussed previously, satellite 12 continuously transmits over one or more broadcast channels 18. ISUs 26 synchronize to broadcast channels 18 and monitor the broadcast channels 18. Preferably, each ISU 26 continually monitors the broadcast channel 18 of the cell in which it is located. Broadcast channels 18 are not dedicated to any one ISU 26, but are shared by all ISUs 26 currently within the footprint of a given satellite 12. In systems that utilize satellites 12 in non-geosynchronous orbits, broadcast channel 18 antenna patterns travel across the surface of the Earth, while ISUs 26 remain relatively stationary. In systems that utilize satellites 12 in geosynchronous orbits, the antenna patterns dedicated to broadcast channel 18 are relatively stationary, while ISUs 26 travel across the surface of the Earth.

Assignments of traffic channels 17 are valid while an ISU 26 remains within a given cell. Generally, based on the movement of a given satellite 12, this period is approximately 30 seconds, according to one example. New traffic channel assignments must be established every period. Because of the fast moving antenna patterns, it is desirable for ISUs 26 to monitor the broadcast channels 18 of adjacent cells that are candidates for handoff. Typically, each ISU 26 is capable of operating with any of the discrete channel sets, and the particular channel set used at any particular time by any particular ISU 26 is controlled by communication system 10.

ISU 26 typically determines which cell to communicate with based on the signal level of the broadcast channel 18 received at the ISU 26. For example, an ISU 26 located within a center region of a cell will probably choose to communicate with the satellite 12 associated with the cell, because the broadcast channel 18 signal level of an antenna pattern is generally the greatest in the center region. If an ISU 26 is located within a region where two antenna patterns or cells overlap, ISU 26 may choose either cell to communicate with because the broadcast channel 18 signal levels are generally similar.

A handoff candidate list is typically generated in advance by a GW 22. GW 22, by knowing the current geometric relationship between cells and the cell shut-down plan, predicts which candidate cells a given ISU 26 can utilize.

GW 22 transfers the time-sequenced handoff candidate list for each cell served by a satellite 12 to each of the satellites 12, which in turn transmits the appropriate list to the ISUs 26 in each of its cells. The ISUs 26 update their candidate list by observing differences between the broadcast channels 18 identified in the handoff candidate update messages and the broadcast channels 18 transmitted in previously provided candidate lists. Whether or not a channel in the current list remains valid is indicated by the current satellite 12 in the candidate update messages.

A handoff request typically includes the candidate cell (e.g., the cell that the ISU 26 wants to transfer its communication). When the satellite 12 receives the handoff request from the ISU 26, the satellite 12 first determines if it also services the requested candidate cell. In inter-cell handoff, the requested candidate cell is serviced by the satellite 12. The satellite 12 places the new uplink and downlink traffic channel assignment into a control field of the next downlink burst to the requesting ISU 26. When the ISU 26 receives the new assignment, it waits until it has received all of the downlink burst and has sent the corresponding uplink burst. The ISU 26 then tunes to the new traffic channel. Next, the satellite 12 directs the traffic for the requesting ISU 26 to the new channel. Since both the old and new channels are on the same satellite 12, the Doppler and timing offsets are the same for both cells at the time of the handoff and the ISU 26 can synchronize immediately. Following the handoff, the ISU 26 discards its current handoff candidate list and the satellite 12 provides a handoff candidate list for the new cell.

A GW 22 is typically responsible for routing the calls from a dialing ISU 26 to a receiving ISU 26. Those skilled in the art will readily recognize that there is no requirement that the handoff control functions be performed in a GW 22. These functions can, for example, be performed in SCS 28 or in any one or a combination of satellites 12 (of FIG. 1).

Figure 2:
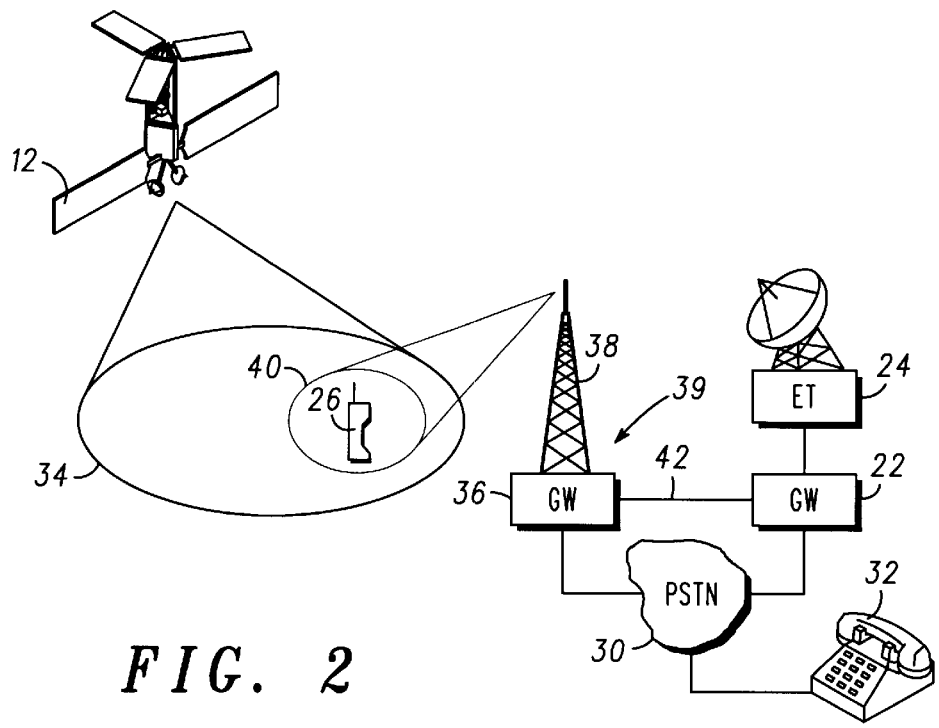
FIG. 2 is a simplified diagram of a communication system that combines a satellite network with a terrestrial network, both of which include buffered packet switching network components, according to an embodiment of the present invention.

FIG. 2 shows an ISU 26 that is capable of communicating with a satellite 12 of communication system 10 (i.e., a satellite network) and a terrestrial network. Preferably, the satellite network and the terrestrial network are radio frequency (RF) networks which are, for example, cellular communication networks. ISU 26 can be, for example, an RF telephone, radio or pager adapted to communicate over networks having different air interface standards. As shown in FIG. 2, the satellite network includes satellite GW 22, satellite ET 24 and satellite 12. As described above, GW 22 is a switching facility which interfaces the satellite network 10 with other communication networks (e.g., public switched telephone network (PSTN) 30 or a cellular radio telecommunication network 39).

GW 22, thus, enables ISU 26 to communicate with a conventional telephone 32 and with other communication devices (e.g., RF telephones and pagers).

ET 24, which is controlled by GW 22, provides an RF interface between GW 22 and satellite 12. Satellite 12 provides at least one communication channel to ISU 26. In a preferred embodiment, communication channels are provided by projecting beams toward ISU 26 which results in coverage footprint 34 on the surface of the Earth.

The terrestrial radio telecommunication network 39 includes a terrestrial GW 36 and an RF antenna 38. GW 36 is functionally the same as or equivalent to GW 22. That is, GW 36 includes a buffer/switch and other circuitry which interfaces the terrestrial network with other communication networks and enables ISU 26 to communicate with a conventional telephone 32 and with other communication devices. GW 36 controls RF antenna 38, which provides at least one communication channel by projecting beams toward ISU 26 that result in coverage footprint 40 on the surface of the Earth.

One of ordinary skill in the art will appreciate that ISU 26 (of FIG. 2) must typically be capable of handing-off between networks having differing air interface standards and differing locational standards. Connection 42 couples satellite GW 22 to terrestrial GW 36 and allows GW 22 and GW 36 to exchange messages and data. GWs 22 and 36 may communicate through a packet network (e.g., system signaling No. 7 (SS7)), which routes messages between GWs 22 and 36.

An ISU 26 might desire an inter-network handoff, for example, when an ISU 26 power measurement of the communication channel indicates that the channel is fading. As another example, when ISU 26 is capable of determining that it is located in an area where one or more alternate networks can provide higher quality service or service at a lower rate, ISU 26 may request an inter-network handoff. As part of the inter-network handoff request, ISU 26 may specify an alternate network to which the ISU 26 prefers to be handed off. When ISU 26 is capable of determining which cell of the alternate network ISU 26 is located within, ISU 26 can also send the alternate cell identification number in the inter-network handoff request.

A GW 22 or 36 may desire an inter-network handoff, for example, when GW 22 or 36 wants to shed some of the traffic load which GW 22 or 36 is supporting. This may occur, for example, if a scheduled or unscheduled service outage is occurring or will occur in the near future. Another reason GW 22 or 36 might want to shed some of its load when it is experiencing higher than desired traffic volume. As another example, if GW 22 or 36 wants to maintain a certain number of channels for high-priority users it might drop some lower-priority users.

Figure 3:
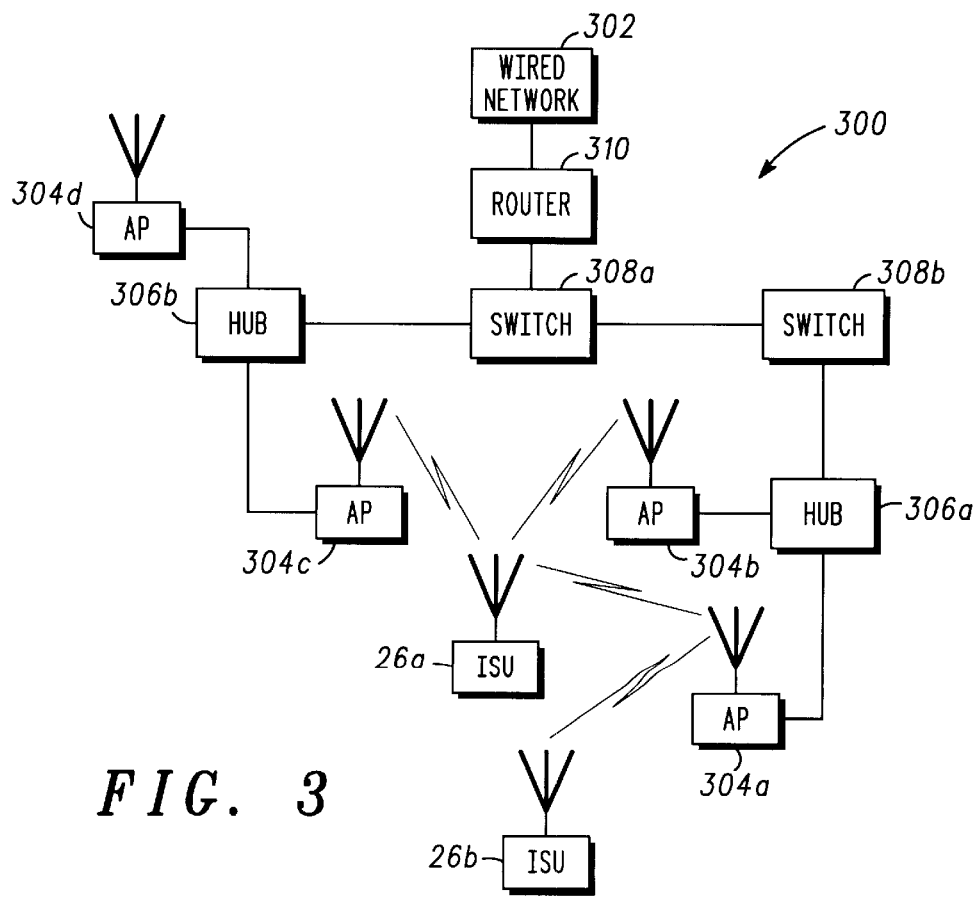
FIG. 3 is a block diagram of a wireless backbone utilizing a router that includes a buffered packet switching network component, according to the present invention.

FIG. 3 illustrates an exemplary wireless local area network (WLAN) 300, preferably implemented as a computer network, that includes a router 310 that couples a wireless device (e.g., ISU 26) to a wired network 302. As implemented in WLAN 300, router 310 connects ISUs 26A or 26B to wired network 302, filters packets based on a destination address and passes packets to/from WLAN 300, as required. As shown, access points (APs) 304A and 304B (e.g., Lucent WavePoint II™ units) are coupled to hub 306A. Hub 306A is coupled to wired network 302 by switches 308A and 308B and router 310. APs 304C and 304D are coupled to hub 306B. Hub 306B is coupled to wired network 302 by switch 308A and router 310. It is contemplated that the present invention can be beneficially incorporated within router 310 of WLAN 300.

In the embodiment shown in FIG. 3, ISU 26 can be, for example, a laptop computer or a handheld computer (e.g., a personal digital assistant (PDA)) that is capable of communicating with wired network 302, as ISUs 26A and 26B move from location to location. APs 304A, 304B, 304C and 304D are radio base stations that are mounted at fixed locations so as to provide access to wired network 302 or allow communication between multiple ISUs 26. APs 304 typically include a transmitter, receiver, antenna, and a bridge that routes packets, for example, to/from wired network 302, as appropriate.

As shown, ISU 26 is a mobile computer that includes a network adapter (NA) that enables wireless communication. A typical NA includes a transmitter, a receiver, an antenna and hardware that provides a data interface to ISU 26. As is typical of wireless systems, WLAN 300 allows roaming. That is, ISUs 26 can accept handoffs as they change coverage areas such that service is continuous. Similar to other systems (e.g., satellite-based systems), in order for a handoff to be successful, it is necessary that tables (located in, for example, a bridge of each AP 304) are updated as the ISUs 26 move from one AP 304 coverage area to another. In a typical WLAN, direct peer-to-peer (i.e., ISU 26A to ISU 26B) communication can be provided in one of two ways. Either an ISU 26 can communicate directly with another ISU 26 or two ISUs 26 can communicate by having transmissions relayed by one or more APs 304. For example, ISU 26B can communicate with ISU 26A through AP 304A or through AP 304A, hub 306A and AP 304B.

Figure 4:
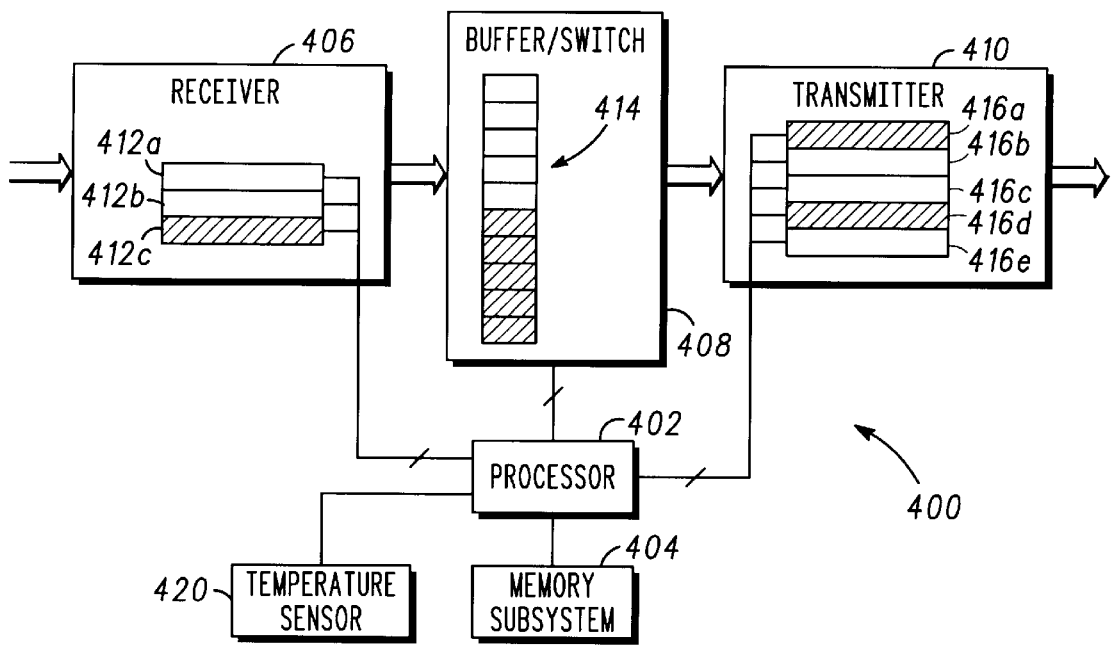
FIG. 4 is a block diagram of a buffered packet switching network component, which implements the present invention.

Referring to FIG. 4, a buffered network packet switched component 400 is shown that can be incorporated within, for example, satellite 12 (FIGS. 1 and 2), gateways 22 and 36 (FIG. 2) and/or router 310 (FIG. 3). A processor 402 is coupled to a memory subsystem 404, a receiver 406, a buffer/switch 408 and a transmitter 410. Receiver 406 is a multichannel receiver that includes a number of channels 412A, 412B and 412C. While only three input channels are shown, one of ordinary skill in the art will appreciate that any number of channels can be implemented, as required. Transmitter 410 is a multichannel transmitter that includes a number of output channels 416A, 416B, 416C, 416D and 416E. While only five output channels are shown, one of ordinary skill in the art will appreciate that any number of output channels can be implemented, as desired. Although transmitter 410 and receiver 406 are shown as separate units, one of ordinary skill in the art will appreciate the transmitter 410 and receiver 406 can readily be implemented within a single unit.

Processor 402 controls channels 412A, 412B and 412C and determines whether a packet received on one of the channels is temporarily stored in FIFO buffer 414 or discarded. Processor 402 also monitors the state of buffer 414 and executes a bandwidth control mechanism (e.g., RED). Processor 402 takes an appropriate action to cause a packet to be marked or discarded as dictated by the bandwidth control mechanism. As shown in FIG. 4, input channel 412C is currently active, FIFO buffer 414 is currently half-full and output channels 416A and 416D are currently active. Buffer/switch 408 routes traffic to an active channel as dictated by processor 402.

As mentioned above, the intent of RED is to prevent buffer 414 overflow while maintaining a near maximum utilization of the packet network. A given RED algorithm performs a time-weighted average buffer size calculation that is compared to a set of marking and/or deleting parameters. If the average buffer size falls below the minimum parameter, no action is taken. If the average buffer size falls above the maximum parameter, the action of marking or deleting occurs. When the average buffer size falls between the minimum and maximum parameters, the probability that the action will occur is a function (typically a linear function) of the average buffer size.

Power management, when implemented, takes control of the bandwidth control mechanism by lowering the minimum and maximum parameters (i.e., the marking and/or deleting parameters). As the parameters are decreased, certain packets are marked or deleted. A cooperating packet destination will receive a marked packet and determine that packet congestion exists along the packet route. The packet destination will then inform the packet source (through, for example, a dedicated message or by setting a bit in a response packet) that a particular buffer/switch along the current packet route is congested.

In response to the message from the packet destination, a cooperating packet source will lower its packet send rate and/or perhaps seek an alternate route. A transition event can be provided by a sensor that monitors a battery voltage, a sensor that monitors an ambient light level or can be based on a timer. In addition, a transition event can be precipitated by temperature sensor 420 indicating that the temperature of transmitter 416 is above a desired level or by a time of day when, for example, power is more expensive for a terrestrial-based buffer/switch.

Figure 5:
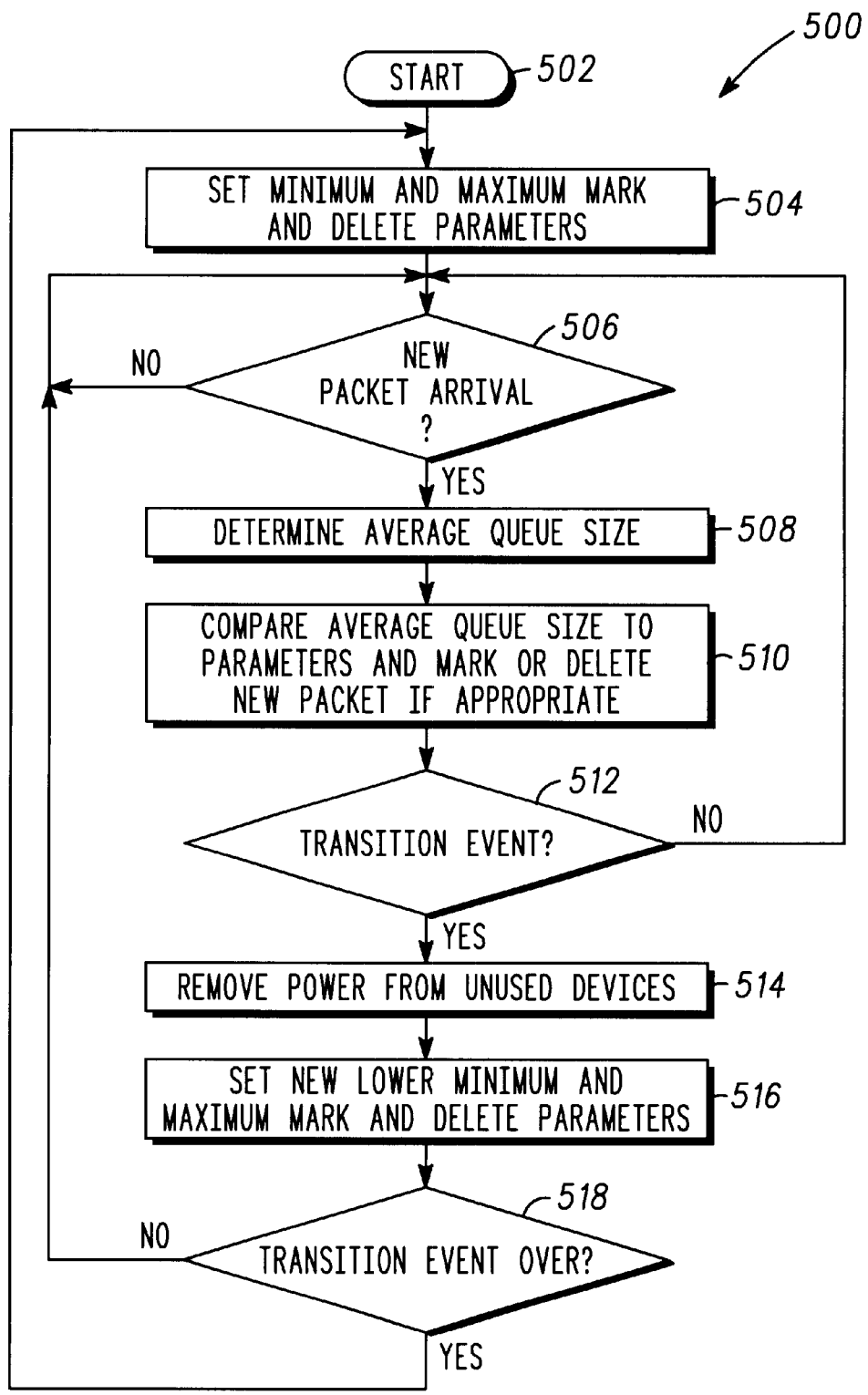
FIG. 5 is a flowchart of a power management routine that is utilized in conjunction with a bandwidth control mechanism, according to an embodiment of the present invention.

Referring to FIG. 5, a power management routine 500 is shown that is utilized in conjunction with a bandwidth control mechanism (e.g., RED), according to an embodiment of the present invention. Routine 500 is initiated in step 502. Next, in step 504, routine 500 causes a minimum and a maximum mark and/or delete parameter to be set to a desired value. Then, in decision step 506, routine 500 determines whether a new packet has arrived. When a new packet arrives, control transfers from step 506 to step 508. In step 508, routine 500 determines the average queue size. Next, in step 510, routine 500 compares the average queue size to the minimum and maximum mark and/or delete parameters and marks or deletes a new packet, if appropriate. From step 510, control transfers to decision step 512.

In step 512, routine 500 detects whether the buffered packet switching network component has had a transition event. In a satellite, a transition event may be initiated by a low battery condition. A low battery condition is typically a result of an eclipse event that prevents a solar panel of a satellite from providing an adequate amount of charge to the battery such that the current communication traffic load can be maintained. One of ordinary skill in the art will appreciate that a transition event can also be initiated by a timer that indicates when an eclipse event will occur. Further, the transition event may be initiated by an over-temperature event. Such an event is applicable to both space-based and terrestrial-based communication systems that include a buffered packet switching network component. When a transition event has not occurred, control transfers from step 512 to step 506.

When a transition event has occurred, control transfers from step 512 to step 514. In step 514, routine 500 causes power to be removed from unused devices (e.g., transmitters and receivers). Next, in step 516, new lower minimum and maximum mark and/or delete parameters are set. Then, in decision step 518, routine 500 determines whether the transition event is on-going. If so, control transfers from step 518 to step 506. Otherwise, control transfers from step 518 back to step 504.

Thus, a technique has been described which conserves power in a buffered packet switching network component, that responds to a bandwidth control mechanism, by reducing communication traffic in response to buffer congestion. Implementing the present invention with a bandwidth control mechanism, such as RED, minimizes the complexity of power management, while at the same time allowing customers to maintain a quality of service (QOS) as resources are taken off-line by placing the responsibility for throughput reduction on network users. This technique typically provides for a rapid response to power reduction requirements without normally having to drop packets, which negatively impacts the QOS.

As previously stated, power management forces an implemented bandwidth control mechanism (e.g., RED) to artificially increase the probability of network congestion notification. This allows network users to detect congestion and negotiate a lower packet rate, which reduces network throughput allowing unused network resources (e.g., transmitters) to be shut-down to conserve power. This is advantageous in that most prior art techniques shut-down resources without warning, which results in packets being dropped and the QOS being lowered. Further, the present invention does not require complex network/link layer messaging to notify users of impending network traffic reduction. The present invention makes RED an active network traffic regulator rather than a reactive network traffic regulator.

The present invention, in combination with RED, can control utilization of any network component whose power consumption is a function of traffic. The present invention can be implemented in software with existing bandwidth control algorithms, such as RED. Alternatively, the present invention can be implemented in hardware within an application specific integrated circuit (ASIC). Adding power management to a simple RED software implementation can be achieved with a single conditional clause (logic OR expression) tied to the statement that executes the packet marking and/or deleting.

The present invention is particularly advantageous when implemented within a satellite as it reduces the complexity of the required power management, which translates into a reduction of size, weight and power, which, in turn, reduces the payload of the satellite. The present invention is applicable to any buffer/switch that provides a power management port that allows traffic to be reduced for reasons other than buffer congestion.

While the principles of the invention have been described above in connection with specific apparatus, it is to be clearly understood that this description is made only by way of example and not as a limitation on the scope of the invention.

What is claimed is:

1. A method of conserving power in a buffered packet switching network component that responds to a bandwidth control mechanism by reducing communication traffic in response to buffer congestion, the buffered packet switching network component providing a communication path between a packet source and a packet destination, said method comprising the steps of:

detecting when a buffered packet switching network component has a transition event;

modifying a parameter of a bandwidth control mechanism in response to the transition event such that a transferred packet indicates the buffered packet switching network component is congested;

requesting a packet source to reduce a packet rate in response to the transition event;

deactivating unused devices of the buffered packet switching network component such that power is conserved; and the transition event is a low battery condition a timer expiration, or a temperature change.

2. The method of claim 1, wherein the bandwidth control mechanism is random early detection (RED).

3. The method of claim 1, wherein the buffered packet switching network component is included within a satellite.

4. The method of claim 1, wherein the buffered packet switching network component is included within a router.

5. The method of claim 1, wherein the low battery condition is a result of an eclipse event that prevents a solar panel of a satellite from providing an adequate amount of power to maintain a current communication traffic load.

6. The method of claim 1, wherein the parameter includes a marking parameter and a deleting parameter.

7. The method of claim 1, wherein the transition event is expiration a timer that indicates when an eclipse event will occur.

8. The method of claim 1, wherein the transition event is an over-temperature event.

9. A buffered packet switching network component that responds to a bandwidth control mechanism by reducing communication traffic in response to buffer congestion, the buffered packet switching network component providing a communication path between a packet source and a packet destination, said buffered packet switching network component comprising:

a multi-channel receiver for receiving packetized information from a packet source;

a memory for buffering the packetized information;

a multi-channel transmitter for transmitting the received packetized information to a packet destination;

a switch for providing the buffered packetized information to the multi-channel transmitter;

a processor coupled to and controlling the multi-channel receiver, the memory, the multi-channel transmitter and the switch; and processor executable code, for causing the processor to perform the steps of:

detecting when a buffered packet switching network component has a transition event;

modifying a parameter of a bandwidth control mechanism in response to the transition event such that a transferred packet indicates the buffered packet switching network component is congested; a deactivating unused devices of the buffered packet switching network component such that power is conserved, wherein the packet destination requests the packet source reduce its packet rate in response to the transition event; and the transition event is a low battery conditions a timer expiration, or a temperature change.

10. The buffered packet switching network component of claim 9, wherein the bandwidth control mechanism is random early detection (RED).

11. The buffered packet switching network component of claim 9, wherein the buffered packet switching network component is included within a satellite.

12. The buffered packet switching network component of claim 9, wherein the buffered packet switching network component is included within a router.

13. The buffered packet switching network component of claim 9, wherein the low battery condition is a result of an eclipse event that prevents a solar panel of a satellite from providing an adequate amount of power to maintain a current communication traffic load.

14. The buffered packet switching network component of claim 9, wherein the parameter includes a marking parameter and a deleting parameter.

15. The buffered packet switching network component of claim 9, wherein the transition event is expiration a timer that indicates when an eclipse event will occur.

16. The buffered packet switching network component of claim 9, wherein the transition event is an over-temperature event.

17. A satellite that includes a buffered packet switching network component that responds to a bandwidth control mechanism by reducing communication traffic in response to buffer congestion, the buffered packet switching network component providing a communication path between a packet source and a packet destination, said satellite comprising;

a multi-channel receiver for receiving packetized information from a packet source;

a memory for buffering the packetized information;

a multi-channel transmitter for transmitting the received packetized information to a packet destination;

a switch for providing the buffered packetized information to the multi-channel transmitter;

a processor coupled to and controlling the multi-channel receiver, the memory, the multi-channel transmitter and the switch; and processor executable code, for causing the processor to perform the steps of:

detecting when a buffered packet switching network component has a transition event;

modifying a parameter of a bandwidth control mechanism in response to the transition event such that a transferred packet indicates the buffered packet switching network component is congested; and deactivating unused devices of the buffered packet switching network component such that power is conserved, wherein the packet destination requests the packet source reduce its packet rate in response to the transition event; and the transition event is a low battery condition a timer expiration, or temperature change.

18. The satellite of claim 17, wherein the bandwidth control mechanism ie random early detection (RED).

* * * * *